Oct. 4, 1966 A. LAUGHLIN 3,276,582
GRAVITY OPERATED APPARATUS FOR GRADING ARTICLES BY WEIGHT
Filed Oct. 7, 1963 5 Sheets-Sheet 2
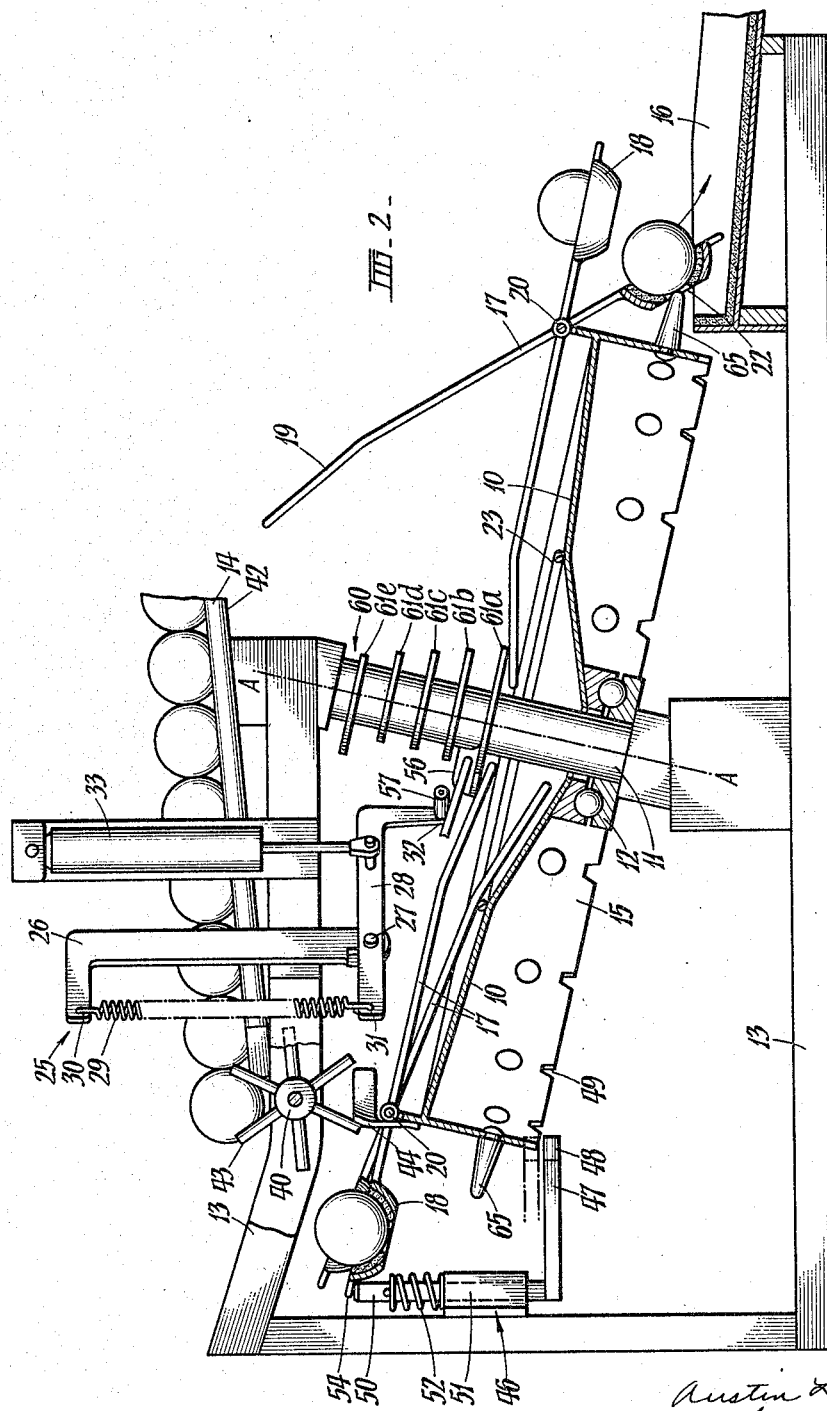

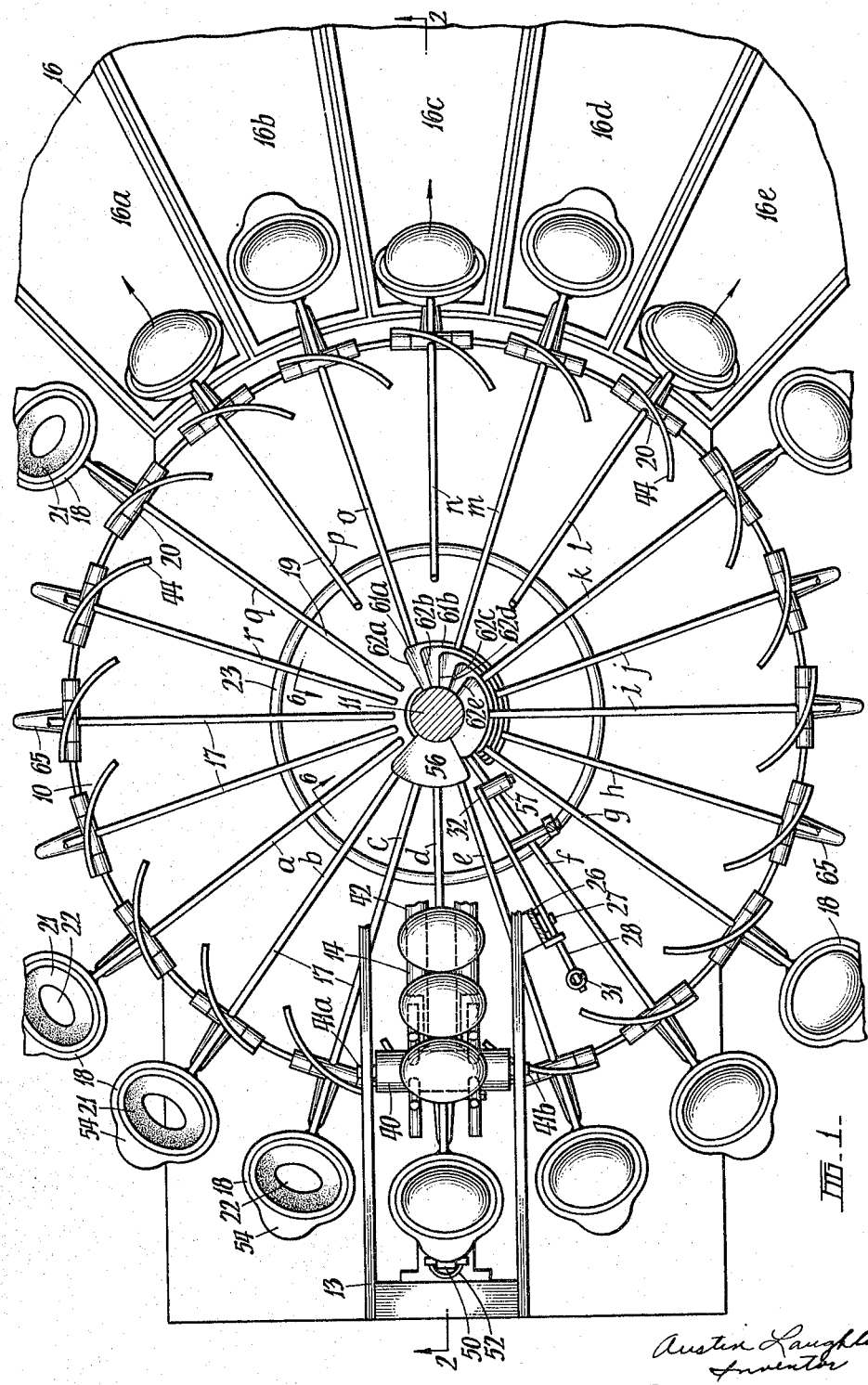

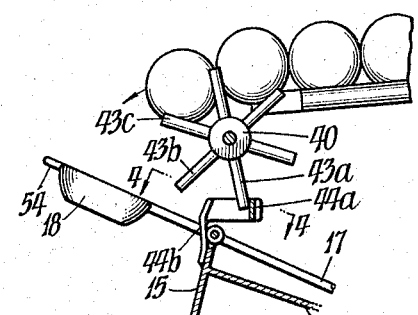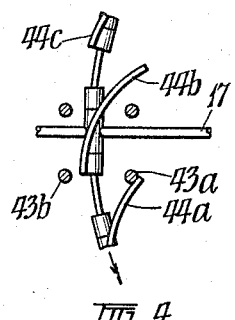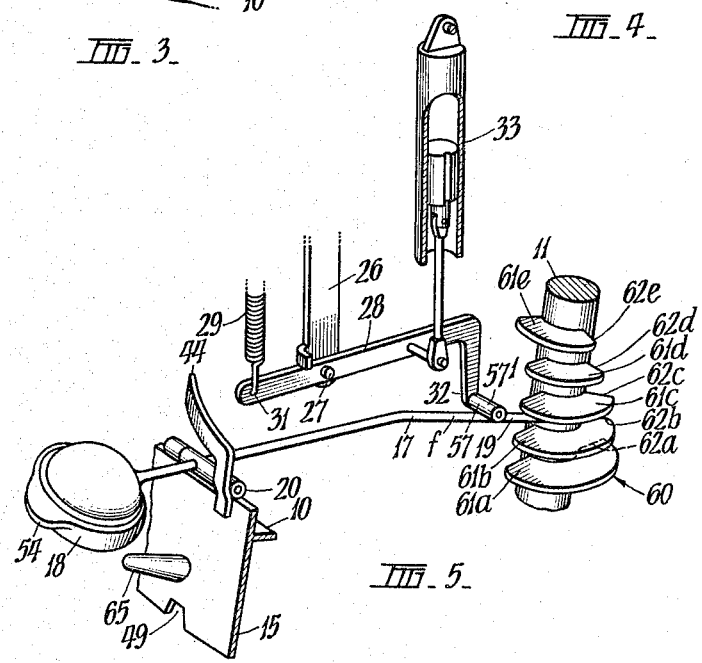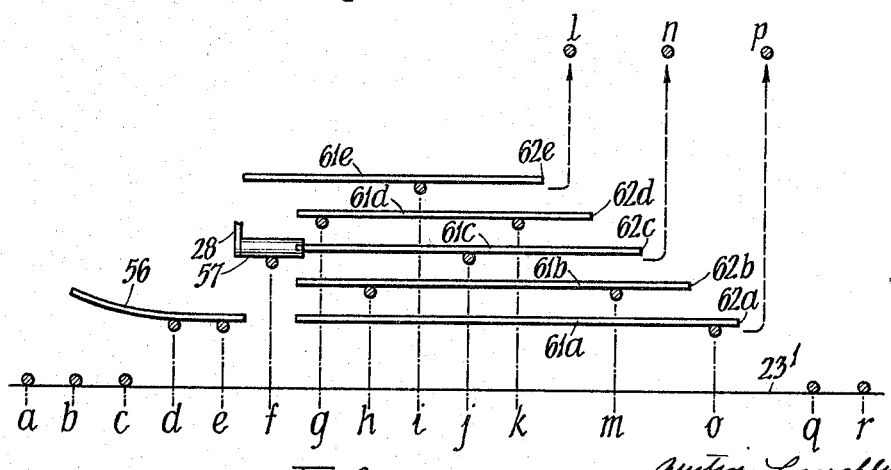

Oct. 4, 1966  A. LAUGHLIN  3,276,582
GRAVITY OPERATED APPARATUS FOR GRADING ARTICLES BY WEIGHT
Filed Oct. 7, 1963  5 Sheets-Sheet 4
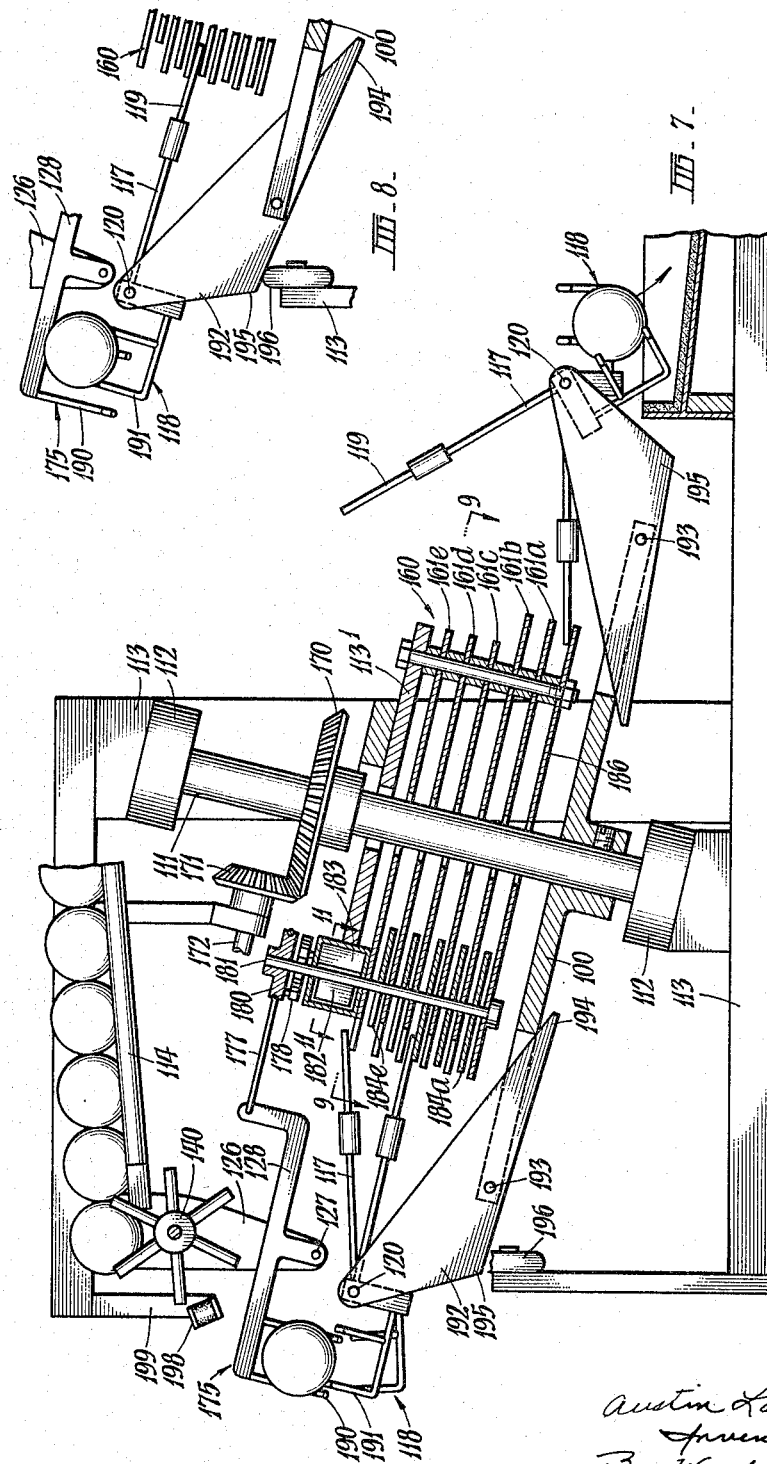

Oct. 4, 1966 A. LAUGHLIN 3,276,582
GRAVITY OPERATED APPARATUS FOR GRADING ARTICLES BY WEIGHT
Filed Oct. 7, 1963 5 Sheets-Sheet 5
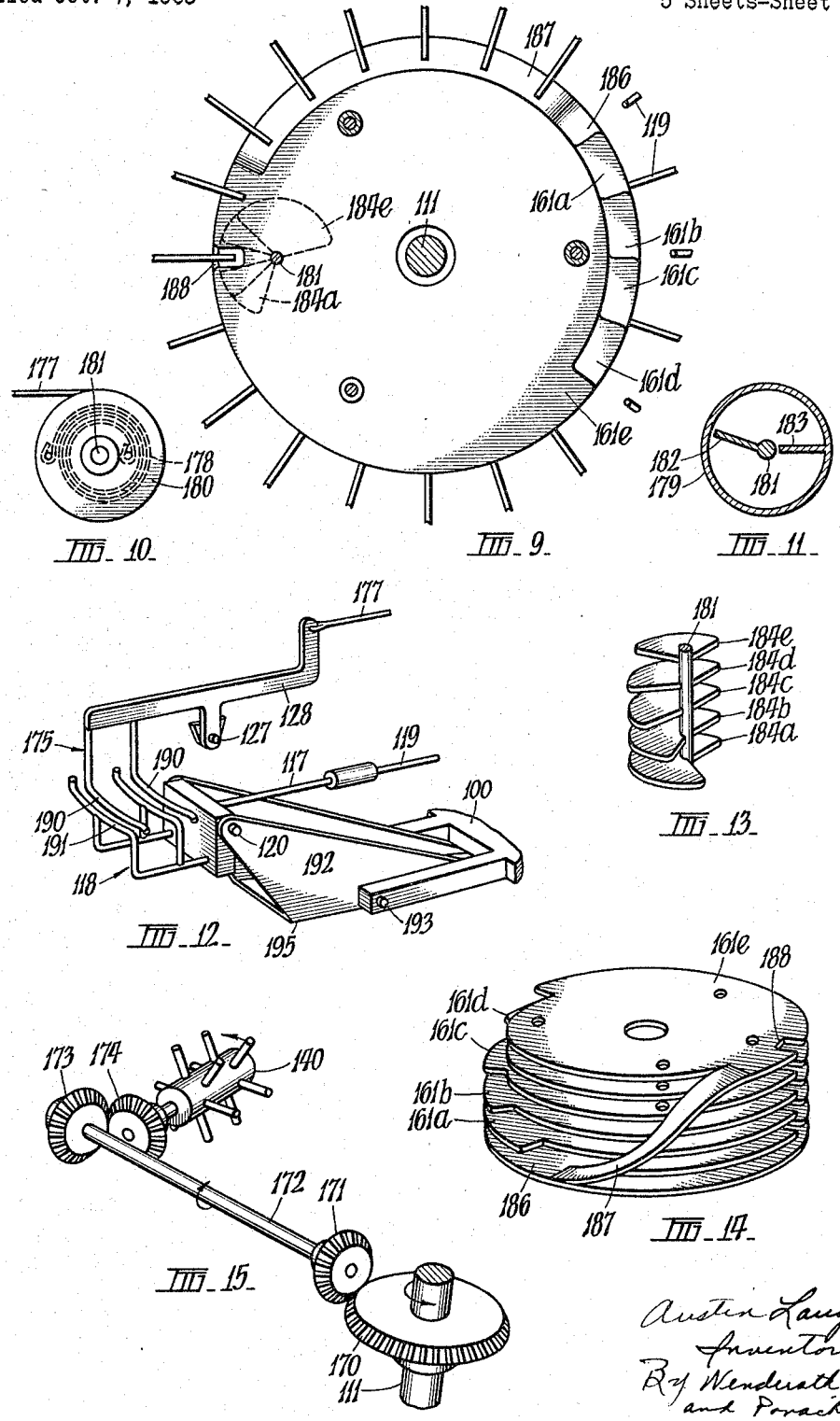

United States Patent Office 3,276,582
Patented Oct. 4, 1966

3,276,582
GRAVITY OPERATED APPARATUS FOR GRADING ARTICLES BY WEIGHT
Austin Laughlin, Clematis, Victoria, Australia
Filed Oct. 7, 1963, Ser. No. 314,413
Claims priority, application Australia, Oct. 11, 1962, 23,109/62
12 Claims. (Cl. 209—121)

This invention relates to grading apparatus by weight and more particularly to such apparatus that is operated by gravity alone and does not require a source of motive power.

The invention has especial application to the grading by weight of articles—particularly fragile articles—whose weight does not correspond exactly to their shape or size, such as eggs, which require to be graded into a number of categories.

Power operated grading machines are known but these are complicated and very expensive.

It is the principal objective of the present invention to provide an apparatus that is relatively simple in construction, inexpensive to manufacture and requires no source of motive power to operate.

With the above objective in view the invention contemplates a gravity operated apparatus for grading articles by weight, comprising a rotatable member arranged to rotate on an axis inclined to the vertical, a plurality of article carriers connected to said member and disposed circumferentially thereof in substantially equidistant relation, each carrier being elongate and pivotally mounted between its ends for tilting action relative to the plane of rotation of said member and having at one end an article-receiving cup outwardly directed from the member, the other end being free and inwardly directed, means for feeding articles one at a time into the cup of the carrier that is at or near the uppermost position of the member thus causing the member to rotate by gravity taking the carrier and article with it towards a lower level, fixed weighing means associated with the carrier at or near the said uppermost position to selectively determine the degree of tilting of the carrier according to the weight of each article being graded whereby the free end of the carrier is brought into register with a corresponding gradation of a selector, each gradation having control means which controls the tilt of the carrier during further rotation of the member and releases the free end of the carrier at a discharge position corresponding to the selected weight thereby enabling the carrier to tilt downward under the weight of the article in the cup until the article is discharged from the cup into a receiving means at the discharge position, whereafter still further rotation of the member takes the carrier to the said uppermost position from which position the cycle is repeated.

Preferably the means for feeding the article to the cup comprises a chute sloping down from an article supply source to a location adjacent the said cup, at which location there is a gate arranged to release one article only at a time responsive to a trip or other suitable mechanism operated by the rotation of the member, this mechanism being correlated with the arrival of each succeeding cup at or near the said uppermost position, where it is in readiness to receive the article and thus contribute to the continued gravitational rotation of the member. A suitable gate for this purpose is a multi-compartment star-wheel.

In one practical example of the apparatus, intended for grading eggs, the rotatable member is in the form of a disc or wheel and each carrier consists of an inflexible rocker arm, at the outer end of which is a cup-like receptacle shaped to receive an egg.

Each carrier is pivotally connected to the periphery of the disc so that the cup end projects outwardly thereof, unimpeded by the disc, and the other end of each rocker arm points towards the centre of the disc. The pivotal connection is such that each carrier rocker arm is free to move in a plane substantially radial to the axis of rotation of the disc but in no other direction. Each cup may have an opening in its base to assist in locating the egg.

Preferably all rocker arms are unbalanced slightly so that their free ends (i.e. inwardly pointing ends) outweigh the cup ends when unloaded, at all points of the rotation of the disc, and the arrangement is such that each cup is substantially horizontal when at the highest point of the disc's rotation, i.e. at the loading station, and returns to the near-horizontal automatically when its load is discharged.

In one arrangement the weighing means is so constructed that one end of each carrier engages a balance scale, immediately after the carrier leaves the loading station, when the loaded cup actuates the scale. The arrangement is such that the balance scale is actuated until a balance is reached according to the weight of the egg in the loaded carrier cup, which latter falls in an arcuate path, causing the free end of the carrier to rise in an arcuate path in exact proportion to the weight of the egg in the cup of the carrier.

The selector, in this example, comprises a number of fixed arcuate galleries partly encircling the axis of the disc, the axial position of each gallery being correlated with the position of the free end of the carrier when it arrives at a predetermined weight-range position corresponding to a particular grade of eggs.

As the disc continues to rotate, by gravity, releasing the cup end from the scales, the free end of the carrier is already engaged by the selected gallery and guided thereby, preventing further tilting of the rocker arm during subsequent angular movement of the disc, until the cup end of the carrier is opposite an appropriate receiving tray for that grade of eggs, when termination of the gallery releases the free end and allows the cup end of the carrier to tilt downwards thereby discharging the egg into the receiving tray according to its grade.

It will be understood that there is provided a gallery for each grade (i.e. weight-range) of eggs, the galleries being of different arcuate lengths, the terminus of each gallery being in radial alignment with the particular receiving tray or like compartment into which the grade corresponding to that gallery is to be discharged.

The commencement of the galleries is, of course, in the same radial alignment, viz. corresponding to a position of the cup end of the carrier after weighing has been effected but before the carrier has been released from the balance scale.

Final discharge of the eggs may be facilitated by locating a soft buffer device in alignment with each discharge position so that as the cup end of the carrier falls the buffer will operate, through the opening in the base of the cup, to positively eject the egg into the respective receiving tray.

Two practical arrangements of the invention will now be described with reference to the accompanying drawings in which:

FIG. 1 is a plan view of one embodiment of the invention with portion of the upper parts cut away for clarity.

FIG. 2 is a sectional elevation substantially on the line 2—2 of FIG. 1, with the rotatable member shown in true section.

FIGS. 3 and 4 are side elevation and plan views, respectively, partly in section, of details of part of the feeding means, FIG. 4 being taken on the line 4—4 of FIG. 3.

FIG. 5 is a perspective view of a detail showing the operation of the balance scale in determining the gradation of the selector for a particular weight of article.

FIG. 6 is a diagrammatic development showing a linear representation taken on the circular line 6—6 of FIG. 1.

FIG. 7 is a side elevation, partly in section of a second embodiment of the invention, with parts cut away for clarity.

FIG. 8 is a detail of the carrier action in the embodiment of FIG. 7.

FIG. 9 is a sectional plan view of the selector, taken on the line 9—9 of FIG. 7.

FIG. 10 is a detail of a form of spring balance.

FIG. 11 is a section taken on the line 11—11 of FIG. 7 and is a detail of a form of dash-pot incorporated in the spring balance of FIG. 10.

FIG. 12 is a perspective view of a carrier according to the second embodiment of the invention.

FIG. 13 is a perspective view of a detail of FIGS. 7 and 9.

FIG. 14 is a perspective view of the selector galleries of FIGS. 7 and 9, and

FIG. 15 is a perspective view of a form of positive drive for the gate of the feeding means.

Referring now to FIGS. 1 to 6, the rotatable member 10 is in the form of a dished disc arranged for rotation about an inclined axis A—A of a centre column 11 and supported in an anti-friction bearing 12. The column 11 is mounted in a frame 13 which supports also a sloping chute 14 of the feeding means, and compartments 16 of the receiving means.

A plurality of article carriers 17, in the form of inflexible rocker arms, are pivotally mounted at 20 on the peripheral edge of the disc 10 in substantially equidistant relation, each rocker arm being identical and having at one end an article-receiving cup 18, outwardly extending from the disc 10, the other end being a free end 19 inwardly directed towards the axis A—A. The pivotal mounting 20 of each rocker arm 17 is such that it can tilt freely in a plane substantially at right angles to the plane of rotation of the disc 10, but in no other direction.

As the example taken is intended for grading eggs by weight, the cups 18 are suitably shaped, that is to say somewhat oval in plan, and are lined with a cushioning substance, such as sponge rubber, shown at 21. An opening 22 in the bottom of each cup 18 helps to locate the article in the cup.

Each rocker arm 17 is unbalanced slightly so that its free end 19 outweighs the cup end 18 when unloaded and therefore tends to take up a position in which the free end 19 is supported by a stop ring 23. In this position the cup 18 is substantially horizontal when at the highest point of the disc 10, i.e. at the loading station.

The balance scale (which in this example is a spring-balance) is indicated generally at 25 and comprises a bracket 26 rigidly mounted on the frame 13, at the lower end of which bracket there is pivotally supported at 27 a spring-balance beam 28. The spring 29 of the spring balance 25 is connected at one end, 30, to the bracket 26 and at the other end, 31, restrains the beam 28 proportionally to a load applied in an upward direction at the operative end 32. A dash pot 33, of well known type, serves to damp out surging or vibration of the spring-balance in operation.

The feeding means for feeding eggs one at a time to a waiting cup, comprises a gate consisting of a six-compartment star-wheel 40, rotatably mounted in the frame 13 at 41a and 41b. The downwardly sloping chute 14, which comprises two parallel rails 42, is arranged to supply eggs to the uppermost compartment of the star-wheel 40, the angle of slope being such that a line of eggs on the chute, tending to roll down the rails, produces a turning torque on the star-wheel 40, urging it to rotate in an anti-clockwise direction, as seen in FIG. 2.

Each star 43 at one end of the star-wheel 40 is, in turn, restrained from angular movement by a cam 44 rigidly mounted on the periphery of the disc 10, there being one cam 44 for each rocker arm 17, the shape of the cam 44 being such that, as the disc 10 rotates, the star following the cam permits the star-wheel 40 to rotate gradually as best seen in FIGS. 3 and 4. As the star 43a comes to the end of cam 44a, the succeeding cam 44b is automatically positioned to arrest the succeeding star 43b as the star-wheel completes an angular movement of 60°. The next succeeding cam 44c arrests the next succeeding star 43c after star 43b leaves cam 44b, completing a further 60° angular movement of the star-wheel 40, and so on.

At the time the star-wheel moves angularly through 60°, an egg in the uppermost compartment is carried around and downward by the star-wheel 40 and immediately thereafter is decanted from the said compartment into a waiting cup 18, another egg automatically rolling into the next succeeding compartment of the star-wheel that now becomes uppermost, and so on. Obviously the star-wheel may have other than six compartments, in which case the said angular movement would be other than 60° and would be determined by the formula: 360 divided by the number of compartments.

To ensure that there is a cup 18 waiting in the correct position to receive the egg decanted from the star-wheel 40, a trip means 46, mounted on the frame 13, comprises a toggle, one end 48 of which is adapted to engage in notches 49 located at equidistant intervals around a skirt 15 of the disc 10. The other end of the toggle 47 is integral with a vertical shaft 50 arranged for axial sliding (but non-rotatable) in a block 51 rigid with the frame 13, the shaft 50 being biased upwardly by a light spring 52. The end 48 of the toggle 47 normally engages in a notch 49 to hold the disc 10 momentarily when a cup 18 is in the correct loading position to receive an egg from the star-wheel 40. Upon receiving the egg and becoming loaded, the cup 18, which is provided with a projecting lug 54, descends and the lug 54 depresses the shaft 50, releasing the toggle end 48 from the respective notch 49 (FIG. 2), whereupon the disc 10 resumes its rotation thereby removing the lug 54 from the shaft 50 so that the toggle end 48 engages in the next succeeding notch 49 as it comes around, thus positioning the next succeeding cup 18 for loading, and so on.

The relationship between the star-wheel 40 and the disc 10 is such that as the disc rotates from one notch 49 to the next, i.e. from one loading position to the next, the star-wheel turns through one-sixth of a revolution and feeds an egg into a cup.

After loading, and before weighing, the rocker arm 17 is prevented from tilting more than is required to release the toggle 47, as above explained, by a quadrant-shaped guide plate 56 rigid with the column 11. The guide plate 56 engages the free end 19 of the loaded rocker arm 17, which free end now tends to rise, and guides it into position to contact the underside of a horizontal arm 57 projecting from the operative end 32 of the beam 28 of the spring-balance 25. The guide plate 56 is associated with the selector 60, and may be in the form of a curved or helical vane, as shown in FIG. 2, in which figure the free end of the preceding rocker arm is shown, fragmentarily operating the spring-balance.

The selector 60 comprises a series of axially spaced arcuate graduation galleries, one for each guide, there being five in the example taken, and indicated 61a to 61e, each said gallery being fixed to and partly encircling the column 11. (These galleries are shown as of decreasing width in ascending order simply for purposes of clarity of illustration, particularly in FIG. 1. In practice they could be of equal width, or even of increasing width, to accommodate the arcuate vertical movement of the rocker arm ends 19.) All the galleries commence at the same circumferential position of column 11, i.e. at a position subsequent in the direction of rotation to the position of the free end 19 of the rocker arm when it first contacts the arm 57 of the spring-balance, but such that the said free end enters the annular space corresponding to the particular gradation before leaving the arm 57, as best seen in FIG. 1.

The galleries are of different arcuate lengths the terminal ends of the galleries being disposed in stepped helical relation, as best shown in FIGS. 1 and 5, and indicated by 62a to 62e, said terminal ends being correlated with compartments 16a to 16e, respectively, so that the rocker arms 17 are released from the respective galleries in accordance with the weight of the egg in each cup 18, when the rocker arm tilts under the weight of the egg and deposits the latter into the appropriate compartment.

Final discharge of the eggs is made more positive, by locating a buffer 65, preferably of soft material such as rubber, in alignment with the opening 22 in each cup when in the discharge position, as clearly shown in FIG. 2.

FIG. 6 is a developed linear representation of the above described operations showing the respective positions of the rocker arm ends 19a to 19r corresponding to FIGS. 1, 2 and 5. In FIG. 6, the index $d$ indicates the rocker arm at the uppermost position immediately after receiving an egg, the cup end of which having descended bringing end $d$ into contact with the guide plate 56. Index $e$ is the end of a loaded rocker arm (immediately preceding $d$) which is still held by the guide plate 56. Index $f$ is the end of a loaded rocker arm that has passed from the guide plate 56 to the arm 57 of the spring-balance 25, which has graded the egg into its weight-range and which, in this example, is assumed to be that defined between the galleries 61b and 61c.

Index $g$ is a loaded rocker arm end that has been previously directed into the weight-range annulus between galleries 61c and 61d. Likewise indices $h, i, j, k, m$ and $o$ represent loaded rocker arms the eggs in which have been previously graded as determined by the spring-balance and are now retained in their selected grades by corresponding galleries 61b, 61e, 61c, 61d, 61b and 61a, respectively.

Index 1 shows a rocker arm end that has been released at the terminus 62e of gallery 61e, into the corresponding gradation of which it was previously guided, and has now tilted discharging its egg into compartment 16e according to the selected grade. Likewise indices $n$ and $p$ represent rocker arm ends that have been released upon reaching the terminations of the respective galleries 61c and 61a that previously contained them, and now have tilted and discharged their eggs into corresponding compartments 16c and 16a.

Indices $q, r,$ and $a, b, c,$ represent unloaded rocker arms on their return journey to the said uppermost position, the biased free ends 19 of which arms ride on the stop ring 23 at a level indicated by the datum line 23' in FIG. 6.

It will be understood that the spring-balance is adjusted to compensate for the bias of each rocker arm, which is a negative factor in the weighing operation, so that in fact the eggs are graded, according to the weight of the naked egg, into predetermined weight-ranges.

Conveniently the arm 57 of the spring-balance is located so that the end 19 of the respective rocker arm contacts it simultaneously with the registering of the toggle end 48 with a notch 49, when the disc is momentarily stationary, so that there is a short dwell during the weighing operation.

Conveniently also, the arm 57 is provided with a roller 57' (FIG. 5) to reduce friction between the rocker arm and the spring-balance as the end 19 of the rocker arm and the beam 28 of the spring-balance move through arcs of different radius and centre.

FIG. 7 depicts a modified version of the invention in which each egg is weighed before entering the cup of the respective rocker arm, thus eliminating the need for the rocker arms themselves being precisely balanced and biased. Another feature of this modification is a positive drive for the star-wheel of the feeding means.

In this embodiment, the frame 113 supports an inclined shaft 111 in anti-friction bearings 112, the shaft 111 being fast with the disc 100 and rotating therewith. A bevel gear 170, fast on the shaft 111 and disposed towards the upper end thereof, meshes with a bevel gear 171 fast on a transverse spindle 172 which drives through bevel pinions 173, 174, the star-wheel 140 (FIG. 15.)

The balance scale comprises a beam 128 pivoted at 127 in a bracket 126 rigid with the frame 113, the outer end of beam 128 being provided with a scale pan 175, and the inner end being operatively connected to a rotary device 176 by a flexible cord 177. The rotary device 176 incorporates a spring-balance comprising a scroll spring 178, disposed about a spindle 181 and fixed at one end to a stationary drum 179, and at the other end to a sheave 180 partially rotatable, together with the spindle 181, by the cord 177 in accordance with the torque applied to the sheave 180 by a load in the scale pan 175, operating through the beam 128 and the cord 177, and resisted proportionally by the scroll spring 178.

Preferably the drum 179 is co-axial with the spindle 181 and has an interior wall 183. Upon the spindle 181 there is an integral fin 182 closely fitting the interior of the drum so as to act as a vane-type dash pot to damp out surging or vibration in the spring-balance in operation (FIGS. 10 and 11).

The galleries 161a to 161e of the selector 160 are, in this embodiment, free of the shaft 111 and supported in a stationary sub-frame 113', on which is mounted the drum 179. The spindle 181 extends outwardly of and below the drum 179 into the region of the selector 160 and supports guide means for guiding the free ends 119 of the rocker arms 117 into the appropriate gradation of the selector.

The guide means comprises a plurality of vanes 184a to 184e, one for each gradation, fast on the spindle 181 and projecting radially therefrom in planes normal to the axis of the said spindle but terminating circumferentially in spiral steps, as best seen in FIG. 13 which is a detail of the guide means.

The selector 160 is provided with a base plate 186 which supports the free end 119 of each rocker arm immediately after the latter has discharged its load and is then biased downwardly, a marginal area of this base plate having a spiral ramp 187 which, as the disc 100 rotates, conveys the said ends 119 upwardly until they ride upon the upper side of the top gallery 161e before reaching the loading position. At the loading position there is an axially aligned recess 188 in each of the galleries through which recess each succeeding rocker arm end 119 can pass downwardly upon reaching it until obstructed by one of the vanes 184a to 184e, as later to be explained.

The scale pan 175 in this embodiment is formed of wire fingers 190 arranged to receive and retain the egg fed to it by the star-wheel 140, the fingers 190 being so shaped and directed that an egg resting therein can easily be removed by sliding in a direction tangential to an arc described by the cups 118 of the rocker arms 117 as the disc 100 rotates.

The cups 118 are likewise formed with wire fingers 191 arranged to avoid the fingers 190 of the scale pan when the two sets of fingers are brought into juxtaposed relation. (FIG. 12.)

In operation, an egg is deposited by the star-wheel 140 into the scale pan 175 where it is weighed by the spring-balance 178 as already described in the process of weighing the sheave 180 and the spindle 181 are partially rotated bringing with them the vanes 184a to 184e, the disposition of which vanes relative to the recess 188 is determined by the weight of the egg in the scale pan 175 (FIG. 9).

Before reaching the weighed egg in the scale pan, the approaching rocker arm is disposed with its free end 119 riding upon the upper side of the gallery 161e. When the free end 119 reaches the recess 188 it falls until arrested by the particular vane 184a to 184e that has been brought into obstructing position in alignment with the recess whereby the said free end is guided into the respective gradation of the selector 160 corresponding to the weight-range determined by the spring-balance. Thus, selection takes place whilst the egg is still in the scale pan and before being adopted by the rocker arm.

Immediately following selection, the cup 118 of the advancing rocker arm sweeps past the scale pan 175, the fingers 191 of the cup 118 taking possession of the egg and carrying it along with them, after which the scale pan returns to the zero position of the spring-balance when the star-wheel is timed to deposit another egg.

To ensure positive lifting of the egg from the scale pan when adopted by the cup, each rocker arm 117 may be pivotally mounted at 120 in a bracket 192 which in turn is pivotally mounted on the disc 100 at 193. This bracket 192 is normally biased to the position shown in FIGS. 7 and 12, i.e., with its inwardly directed end 194 abutting the disc 100. As the respective cup 118 sweeps past the scale pan 175, an outwardly directed portion 195 of the bracket contacts a roller 196 mounted on the frame 113, which roller lifts the outer end of the bracket 192 together with the pivot 120, as shown in FIG. 8, whereby the egg is positively lifted by the fingers 191 of the cup 118 from the fingers 190 of the scale pan 175.

As soon as the rocker arm is loaded, the end 119 is brought to bear against the underside of the gallery 161 corresponding to the selected gradation into which it has already been guided as above described, and the procedure then on is similar to that of the earlier embodiment the ends 119 being released from the galleries in accordance with the selected weight-range to discharge the respective eggs into separate compartments according to grade.

For marking the eggs with a brand or stamp, an inverted rubber stamp may be placed in the path of the eggs either as they roll down the chute 114, or as they leave the star-wheel 140, as shown in FIG. 7, where a stamp 198 of porous rubber or like soft material impregnated with ink is supported by an arm 199 attached to the frame 113. The stamping face of the stamp 198 is upwardly directed and so disposed that each egg leaving the star-wheel 140 contacts it before falling into the scale pan 175. Obviously, the same arrangement for stamping the eggs could be applied to the first described embodiment of the invention.

If it is required to stamp separately each grade of eggs, then a similar device to the foregoing could be provided at each of the discharge positions corresponding to the respective grades, the eggs tumbling on to the soft rubber stamp and being marked with their appropriate grade as they enter their respective compartment.

It will be observed that the operation of the second embodiment is substantially continuous, as distinct from the stop-and-start action of the first embodiment, which stop-and-start action can, without difficulty, be adjusted to control the speed of operation.

Where the operation is continuous and the drive is by gravity, speed control is more difficult as the rate of rotation of the disc is sensitive to the variables, such as load and friction, occurring in the several mechanisms it has to drive. One way of controlling the speed is to increase the angle of inclination of the axis of rotation of the disc so that its speed of rotation engendered by gravity is too great, and employing a disc speed governor as used in gramophones and like instruments.

A preferred method of governing is to apply an auxiliary power drive (for instance, in the form of a fractional horse-power or miniature electric motor, driving through reduction gearing) to the shaft 111, conveniently by means of the existing bevel gear 170. Such an auxiliary power drive provides not only constant speed control but could be adapted for variable speed control at will, as well as affording starting and stopping facilities by switch means remote from the apparatus.

Obviously, such an auxiliary power drive could be applied to the first described embodiment of the invention with similar advantages. Where an auxiliary power drive is applied to a stop-and-start action machine, the drive could be non-positive, e.g., a conventional friction drive.

It is within the purview of the invention to combine certain features of each of the hereinbefore described embodiments, for instance the stop-and-start principle could be applied to the second embodiment. The apparatus could be modified to receive the eggs decanted from the star-wheel into carrier cups before weighing and before selection as in the first embodiment, the cups acting as conveyors only at this stage, the respective eggs being later adopted by the scale pan of the spring-balance which, during weighing, presets the guide means for selection as in the second embodiment. Subsequently the respective eggs are adopted by succeeding cups of carriers in selected gradiations and proceed as hereinbefore described.

I claim:
1. A gravity operated apparatus for grading articles by weight, comprising a rotatable member in the form of a disc arranged to rotate on an axis inclined to the vertical, a plurality of article carriers each in the form of an inflexible rocker arm connected to the periphery of said member and disposed circumferentially thereof in substantially equidistant relation, each rocker arm being pivotally mounted between its ends for tilting action relative to the plane of rotation of said member and having at one end an article-receiving cup outwardly directed from the member, the other end being free and inwardly directed, the cup end of the rocker arm extending outwardly of the said periphery and the other end, i.e. the free end of the rocker arm pointing towards the axis of the member, the pivotal connection permitting each rocker arm to move freely in a plane substantially at right angles to the plane of rotation of the member but in no other direction, all the rocker arms being unbalanced slightly so that their free inwardly directed ends outweigh their cup ends when unloaded, means for feeding articles one at a time into the cup of the carrier that is at or near the uppermost position of the member thus causing the member to rotate by gravity taking the carrier and article with it towards a lower level, each cup being substantially horizontal when at or near the said uppermost position of the member, and returning to a near-horizontal attitude automatically after its load is discharged, fixed weighing means associated with the carrier at or near the said uppermost position to selectively determine the degree of tilting of the carrier according to the weight of each article being graded, said weighing means comprising a balance scale engageable by one end of the rocker arm immediately after the cup is loaded with an article at the said uppermost position and having a control means for each of a plurality of graduations with the free end of the carrier being brought into register with a corresponding graduation of a selector during its tilt; and loaded cup actuating said scale to an extent determined by the weight of the article and bringing the free end of the rocker arm into register with the control means for the corresponding graduation of the selector, said control means controlling the tilt of the carrier during further rotation of the member and releasing the free end of the carrier at a discharge position corresponding to the selected weight thereby enabling the carrier to tilt downward under the weight of the article in the cup until the article is discharged from the cup into a receiving means at the discharge position, whereafter still further rotation of the member takes the carrier to the said uppermost position from which position the cycle is repeated.

2. Apparatus according to claim 1, wherein the means for feeding the article into the cup comprises a chute sloping down from an article supply source to a location adjacent the said cup, a gate at said location arranged to release one article at a time, and a trip mechanism operated by the rotation of the member and actuating said gate, said trip mechanism actuation being correlated with the arrival of each succeeding cup at or near the said uppermost position of the member, thereby loading one of the articles into said cup.

3. Apparatus according to claim 2, wherein the chute of the feeding means is adapted for conveying eggs and comprises an inclined track consisting of two parallel rails spaced apart a distance suitable for supporting the eggs disposed with their longer axes transverse to the run of the track so that the eggs can roll upon the rails, and the gate comprises a multi-compartment star-wheel arranged to receive one egg at a time from the track into one of the said star-wheel compartments whilst simultaneously delivering one egg at a time for another of said star-wheel compartments into a waiting cup.

4. Apparatus according to claim 3, wherein the trip mechanism comprises cams disposed in the region of the periphery of the member, said member having notches therein adjacent to and related to said cams, there being a cam and notch for each carrier, a toggle biased to engage with and coact with each notch in turn to position the respective cup for receiving an egg, said toggle being disengaged from the notch by the loaded cup as it descends under the weight of the egg, the cams co-acting with stars of the star-wheel to permit controlled rotation thereof correlated with the said waiting cup positioned by the respective notch and toggle, the arrangement being such that the weight of the eggs on the inclined track urging them towards the star-wheel and tending to rotate the latter augments the turning torque of the member principally produced by the weight of the eggs on the descending side of the member.

5. Apparatus according to claim 4, including stamping means for ink-marking a stamp upon each article being graded, said stamping means comprising a stamp of porous rubber or like soft material impregnated with ink, upwardly directed and disposed in the path of the articles as they pass through the apparatus so that each article contacts and rolls over the inked stamp surface, thereby receiving the required stamp marking.

6. Apparatus according to claim 1, wherein the selector comprises a series of fixed axially spaced arcuate galleries partly encircling the axis of the member, the axial position of each gallery being correlated with the position of the free end of the rocker arm when the latter arrives at a predetermined weight-range position as determined by the weighing means corresponding to a particular grade of article, whereafter the thus selected gallery engages the said free end and arrests further tilting of the rocker arm for the continuity of the gallery as the member continues to rotate after the cup leaves the weighing means, the galleries being of different arcuate lengths, the terminus of each gallery being at a different radial position adapted to be in radial alignment with a particular compartment of a receiving means for receiving the particular grade of article corresponding to that gallery when the said free end arrives at the said terminus and permits the cup end of the rocker arm to tilt downwards under the weight of the article in the cup thereby discharging the article into the appropriate said receiving compartment according to grading.

7. Apparatus according to claim 6, wherein each said cup has an opening in the base of the cup and a buffer device aligned with the cup with which said opening registers when the latter is in the respective discharge position thereby assisting to discharge the article from the cup by positively ejecting the article into the respective receiving compartment.

8. Apparatus according to claim 7, wherein the buffer device is in the form of a rubber stamp, one for each grade, whereby each article as it is ejected from the cup by the buffer device is marked by the rubber stamp with the respective grading of the article.

9. Apparatus according to claim 1, wherein the balance scale has a scale pan independent of the cups but disposed in the path of the cups when passing at or near the said uppermost position of the member said scale pan being adapted to receive an article from the feeding means, guide means actuated by the balance scale and guiding the free end of the respective carrier into the appropriate gradation of the selector corresponding to the weight of the article in the scale pan, whereafter the article is carried off the scale pan by the carrier cup next approaching it as the said carrier cup proceeds on its course, the arrangement being such that the article is weighed independently of all mechanisms, except the balance scale and the guide means, and subsequently is adopted by the carrier.

10. Apparatus according to claim 9, further comprising a rotary device to which the scale pan is operatively connected and mounted upon a stationary frame supporting the selector and arranged to rotate through at least portion of a revolution responsive to the degree of declination of the scale pan during a weighing operation so that the degree of rotation of the device will vary in accordance with the weight of the article being weighed, the guide means comprising vanes projecting radially from the device and disposed substantially in planes normal to the axis of the device but terminating circumferentially in spiral steps, the selector comprising a plurality of fixed axially spaced arcuate galleries partly encircling the axis of the member, there being one such gallery for each grade and the plane of each said vane being related to such an arcuate gallery, whereby the free end of the respective carrier is guided by the particular vane presented to it in accordance with the weight of the article and enters beneath the corresponding gallery immediately before the article is adopted by the carrier.

11. Apparatus according to claim 10, wherein the feeding means comprises a chute sloping down from an article supply source to a location adjacent the scale pan, a gate at said location consisting of a multi-compartment star-wheel rotatively driven by the rotatable member and arranged to release one article at a time from the chute to the scale pan at a rate correlated with the rate of arrival of each succeeding cup at the said uppermost position of the member.

12. Apparatus according to claim 9, including an auxiliary power drive driving the rotatable member.

References Cited by the Examiner

UNITED STATES PATENTS

| | | | |
|---|---|---|---|
| 1,932,662 | 10/1933 | Hamilton | 209—121 |
| 2,697,516 | 12/1954 | Sneed | 209—121 |
| 2,979,200 | 4/1961 | McBride | 209—121 |
| 3,000,500 | 9/1961 | Kitson | 209—121 |

M. HENSON WOOD, JR., *Primary Examiner.*

R. E. SCHACHER, *Assistant Examiner.*